United States Patent
Goode

(10) Patent No.: US 7,735,891 B2
(45) Date of Patent: Jun. 15, 2010

(54) CORNER RAIL EXTRUSION

(75) Inventor: Tobin Michael Goode, Granger, IN (US)

(73) Assignee: Titan Distribution, LLC, Granger, IN (US)

( * ) Notice: Subject to any disclaimer, the term of this patent is extended or adjusted under 35 U.S.C. 154(b) by 179 days.

(21) Appl. No.: 12/135,372

(22) Filed: Jun. 9, 2008

(65) Prior Publication Data

US 2009/0121511 A1 May 14, 2009

Related U.S. Application Data

(60) Provisional application No. 60/942,577, filed on Jun. 7, 2007.

(51) Int. Cl.
*B62D 27/00* (2006.01)

(52) U.S. Cl. ..................................... 296/29

(58) Field of Classification Search .................. 296/29, 296/186.1, 191, 186.3, 203.03, 203.04; 229/171; 220/1.5

See application file for complete search history.

(56) References Cited

U.S. PATENT DOCUMENTS

| | | | | |
|---|---|---|---|---|
| 2,391,051 A * | 12/1945 | Windsor | ........................ | 5/9.1 |
| 3,831,531 A * | 8/1974 | Wresch | .................... | 105/221.2 |
| 4,268,097 A * | 5/1981 | Woodard | ..................... | 312/137 |
| 5,052,741 A * | 10/1991 | Brown et al. | ................. | 296/191 |
| 5,178,292 A * | 1/1993 | Korzeniowski | .............. | 220/1.5 |
| 5,181,353 A * | 1/1993 | Harrington, Jr. | .............. | 52/79.1 |
| 5,544,454 A * | 8/1996 | Richardson et al. | ......... | 52/171.1 |
| 5,553,906 A * | 9/1996 | Kunz | ............................. | 296/29 |
| 6,250,002 B1 * | 6/2001 | Wittenberg | ................... | 40/603 |
| 7,165,370 B1 * | 1/2007 | Wolfe | ......................... | 52/589.1 |
| 2009/0021046 A1 * | 1/2009 | Goff et al. | .................... | 296/156 |

* cited by examiner

*Primary Examiner*—Kiran B. Patel
(74) *Attorney, Agent, or Firm*—Varnum, Riddering, Schmidt & Howlett LLP

(57) ABSTRACT

A corner rail extrusion (124) is disclosed for facilitating the sealing of joints at the corners of structures such as recreational vehicles. The corner rail extrusion (124) includes a pair of outwardly and generally perpendicularly extending legs comprising a first leg (126) and a second leg (128). The rail extrusion (124) also includes a central bulbous interior (130). The central bulbous interior (130) is positioned so as to span a corner formed by a side wall (104) and rear wall (106), with the bulbous interior (130) essentially "fitting into" a gap (122).

1 Claim, 3 Drawing Sheets

CORNER RAIL EXTRUSION

CROSS-REFERENCE TO RELATED APPLICATIONS

This application claims priority of U.S. Provisional Patent Application Ser. No. 60/942,577, filed Jun. 7, 2007.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The invention relates to devices for facilitating the sealing of joints at the corners of structures such as recreational vehicles, towable trailers, buildings and similar structures, and, more particularly to corner rail extrusions.

2. Background Art

The general concept of employing means for facilitating sealing of joints in the construction of structures such as towable trailers, motorized recreational vehicles, buildings (particularly metal buildings) and similar structures is known in the prior art. For many of these types of structures, a substantially rigid frame is provided, which consists of structural support members, such as studs. The structural support members of the frame support and mount walls on the exterior of the frame. The walls are formed as prefabricated panels placed on the exterior of the frame formed by the structural support members. Corners are formed at the junctures of adjacent panels lying in different, but typically perpendicular planes. Also typically, one of the adjacent panels is intended to overlap the adjacent support member by the thickness of the adjacent panel. In this manner, the adjacent panels lie in perpendicular planes which meet at a butt joint.

In the practice of prior art methods of construction, the tolerances in the dimensions of prefabricated panels are typically not sufficiently small so as to permit the assembly of adjacent walls and proper butt joints. Accordingly, the adjacent panels lying in perpendicular planes typically meet to form an internal (or reverse) 90° opening (or gap), rather than a true butt joint. For purposes of sealing, and as known in the prior art methods of construction, a layer of butyl tape may be sandwiched between the panels and an extruded metal corner rail. By nature, the butyl tape is somewhat tacky, and can be temporarily secured by its inherent tackiness to the inner surface of the extruded corner rail during assembly. With the corner rail, butyl tape and the underlying panel are secured to adjacent and underlying support members by means of mechanical fasteners, such as screws (or, in the case of truck applications, pop rivets). The butyl tape is thereafter trimmed to size.

One disadvantage of the use of butyl tape is the density of the tape. Butyl tape is typically of such a density that it does not conforms to corrugations, variations or other irregularities in the exterior surface of the panels. Accordingly, gaps are left which can then lead to water or other types of leakage or damage. Correspondingly, the butyl tape does not conform to the gap (or internal (reverse) 90° angle) formed at the juncture of adjacent panels meeting in perpendicular planes. Instead, the butyl plate simply spans the gap without conforming to the edges of the panels. Accordingly, the butyl tape does not perform a proper sealing function at the aforementioned gap and, further, creates a channel through which water can run, thereby infiltrating the joint. The use of butyl tape is further disadvantageous in that butyl tape typically dries out and chemically breaks down after a period of use. The butyl tape can then fall out, resulting in further gaps into which water can infiltrate. Still further, the use of butyl material has another disadvantage, in that it tends to expand when subjected to heat and, further, is subject to migration away from pressure, such that the butyl tape tends (when exposed to hot weather) to creep away from the fasteners and corner rail. This creeping movement creates gaps which can permit further water infiltration, as well as create cosmetic problems.

Other devices are known for purposes of facilitating the sealing of corner joints, with respect to other types of corners and panel elements. For example, Larson, U.S. Pat. No. 6,212,836 issued Apr. 10, 2001 describes a self-aligning drywall corner bead. The corner bead includes an arcuately profiled elongated central portion. The central portion includes two lateral edges for defining a concave and a convex surface. Flanges extend from each of the lateral edges and are unilaterally formed therewith. The concave surface includes a pair of longitudinal rails extending at about 90° one from the other, at the geometrical center line of a concave surface. The rails serve to align the corner bead with the underlying drywall, when applied over a drywall corner in a conventional manner.

It is an object of the present invention to provide a method of constructing corners of motorized recreational vehicles, towable trailers, buildings (particularly metal buildings) and similar structures. The corners so constructed facilitate leak resistance by means of the minimization or substantial elimination of gaps through which water or other materials may infiltrate.

It is a further object of the present invention to provide a durable, long lasting seal between a corner rail and the underlying adjacent panels at a corner of a motorized recreational vehicle, towable trailer, building (particularly metal building) or similar structure.

It is a still further object of the present invention to provide a method of constructing a corner of a motorized recreational vehicle, towable trailer, building (particular metal building) or similar structure whereby the corner can be assembled by one person. It is yet another object of the present invention to provide a corner construction for motorized recreational vehicles, towable trailers, buildings (particularly metal buildings) and similar structures whereby a positive seal is formed against the juncture between adjacent panels.

It is yet another object of the present invention to provide a method of constructing corners of motorized recreational vehicles, towable trailers, buildings (particularly metal buildings) and similar structures so as to compensate for fabrication tolerances.

It is a further object of the present invention to provide a corner assembly for motorized recreational vehicles, towable trailers, buildings (particularly metal buildings) and similar structures which accommodates and compensates for variations in panel surface smoothness.

BRIEF DESCRIPTION OF THE SEVERAL VIEWS OF THE DRAWING

The invention will now be described with reference to the drawings, in which.

DETAILED DESCRIPTION OF THE INVENTION

The principles of the invention are disclosed, by way of example, through the use of corner rail extrusions which may be applied to corner sections 100 of a motorized recreational vehicle, with various elements associated with the invention illustrated in FIGS. 1-5. One embodiment of a corner rail extrusion in accordance with the invention is described in the following paragraphs with respect to a corner section 100 of a motorized recreational vehicle. However, it should be understood that the method and structure disclosed herein in accordance with the invention are applicable to other structures, such as towable trailers and buildings (particularly metal buildings). Further, although the corner section 100 is associated with a rear corner of the motorized recreational vehicle, corner rail extrusions in accordance with the invention are applicable to other joints, such as front corners and the like.

Figure 1:
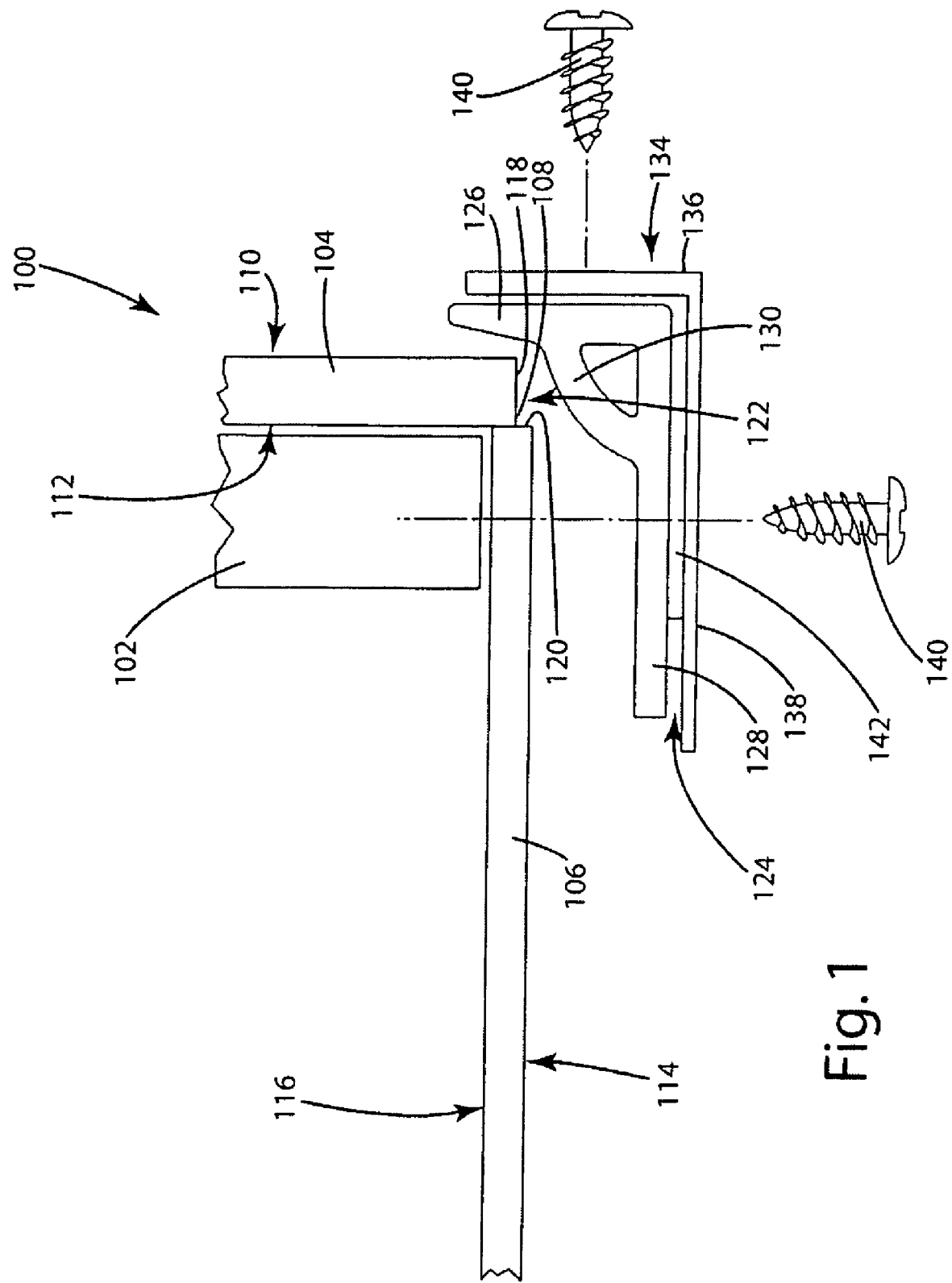
FIG. 1 is a partially structural and partially diagrammatic plan view of the use of a corner rail extrusion in accordance with the invention, as applied to a corner of, for example, a motorized recreational vehicle.

With reference to FIG. 1, the drawing illustrates, in a plan and "diagrammatic" view, a corner section 100 of a motorized recreational vehicle. Recreational vehicles typically comprise a frame, with the frame consisting of a plurality of structural members. In FIG. 1, a structural member is shown as stud 102. Such studs 102 can be wooden, metal or comprise other materials. The frame which consists of these studs 102 typically defines the periphery of the recreational vehicle or enclosures within the vehicle. The studs 102 mount and support walls of the vehicle, which may consist of a series of prefabricated panels. In FIG. 1, the panels are shown as including (and shown only in part) a side wall 104 and a rear wall 106. A typical recreational vehicle will actually include two side walls, as well as a front wall. As further shown in FIG. 1, the adjacent panels or walls 104, 106 lie in perpendicular planes and meet at or adjacent to the stud 102 so as to form the corner 108.

Each of the panels or walls 104, 106 includes two opposing sides and a series of edges. For example, with reference to FIG. 1, the side wall 104 includes an outer first side 110 and a second inner side 112. Correspondingly, the rear wall 106 includes an outer first side 114 and an inner second side 116. Still further, at the location consisting of the corner 108 formed by the walls 104, 106, the side wall 104 includes a first edge 118. Correspondingly, the rear wall 106 includes a first edge 120. The first edges 118, 120 meet at a perpendicular plane so as to form a 90° internal (reverse) angle or "gap" 122.

Further in accordance with the invention, FIG. 1 illustrates the use of a corner rail extrusion 124. The corner rail extrusion 124 is also shown in a stand alone configuration in FIG. 2. The corner rail extrusion 124 includes a pair of outwardly and general perpendicularly extending legs comprising a first leg 126 and a second leg 128. The legs are preferably integrally connected at one end of each of the legs. As particularly shown in FIGS. 1 and 2, the corner rail extrusion 124 also includes a central bulbous interior 130. The central bulbous interior 130 is positioned so as to span the corner formed by the side wall 104 and rear wall 106. The bulbous portion 130 essentially "fits into" the gap 122.

As further shown in FIG. 1, the corner section 100 of the recreational vehicle is further formed through the use of a corner rail or cap 134. The cap 134 has what may be characterized as substantially the same cross-sectional shape as the exterior surfaces of the corner rail extrusion 124. As also shown in FIG. 1, conventional metal fasteners, such as screws 140, can be extended through apertures (not shown) extending through the cap 134, corner rail extrusion 124, walls 104, 106 and into the underlying stud 102. In this manner, the corner rail or gap 134, corner rail extrusion 124 and legs 102, 104 are supported by the stud 102. Although FIG. 1 illustrates screws 140, it should be emphasized that numerous other types of connecting elements may be utilized. For example, in truck applications, it may be preferable to utilize pop rivets in place of the screws 140.

Figure 2:
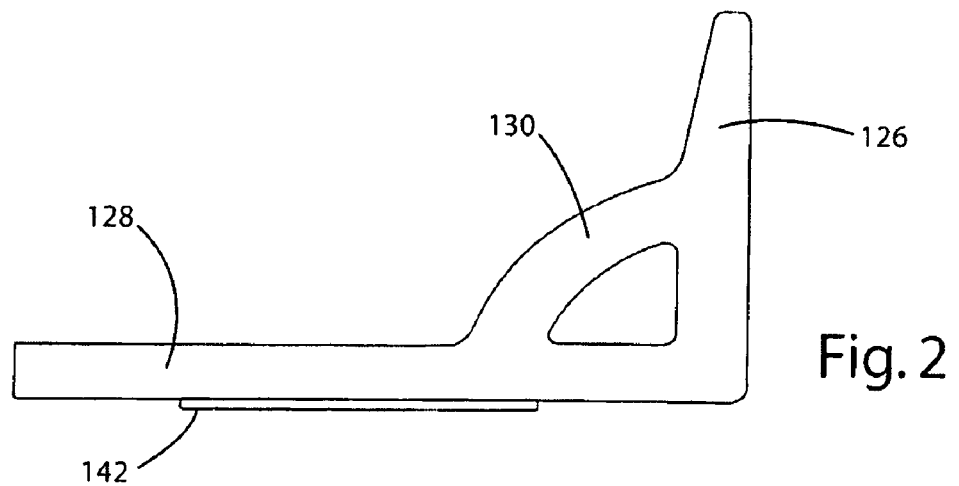
FIG. 2 is a machine drawing of a plan view of the corner rail extrusion in accordance with the invention, in a stand alone configuration.

Preferably, the corner rail extrusion 124 is composed of a weather resistant and pliable rubber-like material. In what may be characterized as the preferred embodiment, ethylene propylene (EPDM) closed cell-ASTM D-10565, 2A2 may be utilized. Also, as illustrated in FIGS. 1 and 2, a pressure sensitive rubber based adhesive 142 or similar product may be affixed to outer surfaces of one or more of the legs 126, 128 of the corner rail extrusion 124. This adhesive 142 may be used for affixing the corner rail extrusion 124 to the interior of the corner rail or cap 134, for purposes of facilitating assembly.

Still further, the thickness of the outwardly extending legs 126, 128 of the corner rail extrusion 124 may be varied, based upon the profile of the underlying panels or walls 104, 106. That is, and for example, where the surfaces of the underlying walls 104, 106 are corrugated or otherwise irregular, it is preferable to have the legs 126, 128 of the corner rail extrusion 124 be relatively thick. In contrast, in applications where the surfaces of the walls 104, 106 are relatively regular, smooth and non-corrugated, the thickness of the outwardly extending legs 126, 128 of the corner rail extrusion 124 may be relatively small.

Still further, the lengths of the legs 126, 128 of the corner rail extrusion 124 can be varied as desired. In particular, the lengths of the legs 126, 128 can be adapted to match the dimensions of the corner rail or cap 134. In this manner, and while in use, the corner rail extrusion 124 can be concealed behind the corner rail or cap 134.

The central bulbous interior 130 of the corner rail extrusion 124 can be sized and configured so as to span the bight portion of the corner rail extrusion 124. The bulbous interior 130, in accordance with the invention, is adapted to form a positive seal against adjacent panel edges 118, 120 and sides 110, 114 of the walls 104, 106.

In somewhat of a brief summary, the corner rail extrusion 124 can be manufactured or formed by conventional extrusion techniques. The corner rail extrusion 124 is formed in a cross section having a bight portion and two outwardly extending legs 126, 128. The extrusion 124 is formed so that the outer surface of the corner rail extrusion 124 corresponds to inner surfaces of the corresponding corner rail or cap 134. As also earlier described, the corner rail extrusion has a bulbous portion 130 spanning the central bight portion of the extrusion 124. Still further, a pressure sensitive rubber-based adhesive (or similar material) can be applied to an inner surface of the corresponding cap 134. The corner rail extrusion 124 can be placed in the cap 134 so that the extrusion 124 is secured, at least temporarily, to the cap 134 by means of the adhesive 142. In a preferred embodiment, the adhesive 142 may be preferably applied to the larger rear-facing leg 138 of the corner rail or cap 134, so as to permit the corner rail or cap 134 and corner rail extrusion 124 to be handled as a unit during assembly, but to permit movement of the opposite leg 126 of the corner rail extrusion 124 with respect to the corner rail or cap 134 during assembly.

The corner rail or cap 134 and corner rail extrusion 124, during assembly, are then placed against the adjacent walls 104, 106, so that the central bulbous interior or portion 130 of the corner rail extrusion 124 is pressed into and against the gap 122 formed by the edges 118, 120 of the adjacent walls 104, 106. In this manner, the bulbous interior 130 exerts a positive pressure seal against the underlying walls 104, 106. As also earlier described, metal fasteners or screws 140 (or, in case of truck applications, pop rivets) are placed through each leg 136, 138 of the cap 134 so as to secure the cap 134, corner rail extrusion 124 and panels or walls 104, 106 to the underlying and adjacent support member stud 102. In a preferred embodiment, these fasteners 140 (or similar fasteners) are located at intervals of six inches along the lengths of the corner rail or cap 134 and corner rail extrusion 124.

In accordance with the foregoing, the corner rail extrusion 124 and the associated method of assembly as described previously herein can be utilized to seal joints between adjacent walls of motorized recreational vehicles, towable trailers, buildings (particularly metal buildings) and similar structures. The design of the bulbous interior 130 of the corner rail extrusion 124 accommodates irregularities in the joint or gap between the adjacent panels or walls.

The ethylene propylene (EPDM) closed cell-ASTM D-10565, 2A2 or similar weather resistant pliable rubber-like material has relatively good weather and ultraviolet resistance. In this manner, it is believed that the seal will last for the life of the unit, while requiring relatively minimal maintenance or repair. Still further, the present invention and method of assembly provides for a seal that is resistant to leaks, and which does not creep under heat. Still further, the invention provides for a leak resistant seal conformable to variations in irregularities in the surfaces of the walls or panels, such as those which may result from corrugation or other imperfections. In addition, the present invention and method of assembly provide means by variation of thicknesses of the leg portions of the corner rail extrusion to accommodate relatively large variations or irregularities in exterior surface smoothness of the walls or panels. In addition, the present invention and method of assembly provides for a sealing mechanism that will not degrade or otherwise fall off over time. In addition, the corner rail extrusion can be characterized as providing for a sealing material for filling and positively sealing the joints between adjacent legs of adjacent panels. In addition, corner rail extrusions in accordance with the invention do not require trimming, as the corner rail extrusions are formed to the desired size. It should also be emphasized that corner rail extrusions in accordance with the invention may be utilized with respect to other types of corners, such as horizontal corners found between walls and floors, or walls and ceilings.

Figure 3:
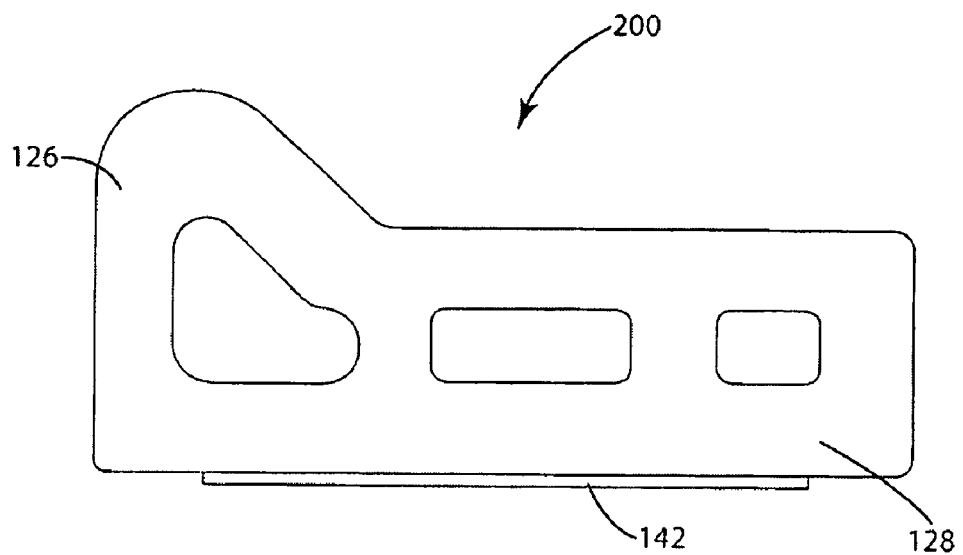
FIG. 3 is a plan view of a second embodiment of a corner rail extrusion in accordance with the invention.
Figure 4:
FIG. 4 is a plan view of a third embodiment of a corner rail extrusion in accordance with the invention.
Figure 5:
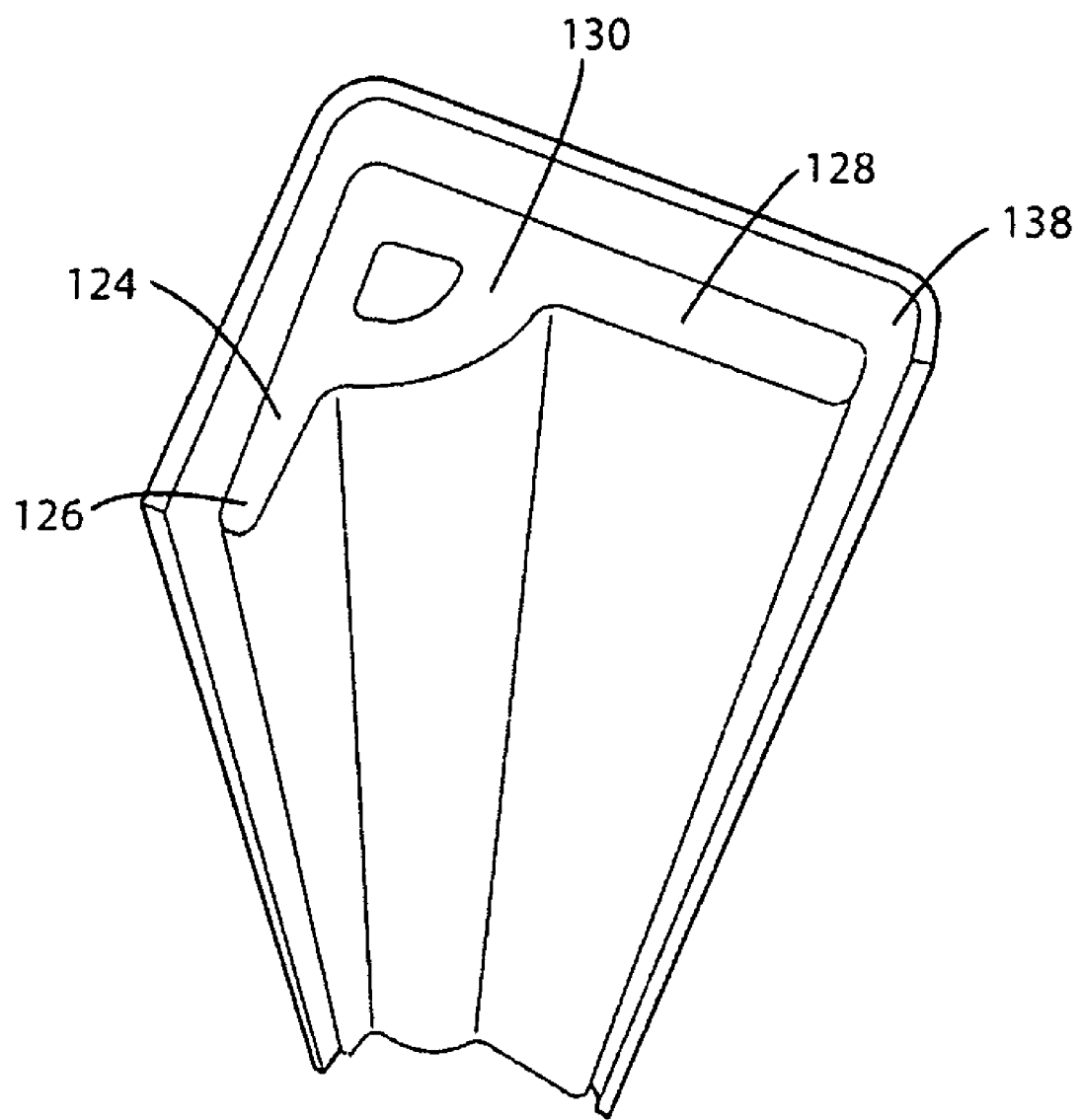
FIG. 5 is a photograph showing the relative positioning of the corner rail extrusion shown in FIG. 1, relative to the cap which will surround the corner rail extrusion.

In addition to the embodiment of a corner rail extrusion as illustrated in FIGS. 1 and 2, FIG. 3 illustrates a plan view of a further corner rail extrusion 200 which may be utilized in accordance with the invention. In addition, FIG. 4 illustrates a third embodiment of a corner rail extrusion 300 in accordance with the invention.

It will be apparent to those skilled in the pertinent arts that other embodiments of corner rail extrusions in accordance with the invention can be designed. That is, the principles of corner rail extrusions in accordance with the invention are not limited to the specific embodiments described herein. Accordingly, it will be apparent to those skilled in the art that modifications and other variations of the above-described illustrative embodiments of the invention may be effected without departing from the spirit and scope of the novel concept of the invention.

The invention claimed is:

1. A corner rail extrusion adapted to be applied to a corner section of a motorized recreational vehicle, with the corner section comprising a series of studs forming a frame, the studs mounting and supporting walls of the vehicle, with the walls consisting of a series of pre-fabricated panels, including a side wall and a rear wall;

each of the walls including two opposing sides and a series of edges, with the side all including an outer first side and a second inner side, and with the rear wall including an outer first side and an inner second side;

the side wall having a first edge at the location of the corner formed by the side wall and a rear wall, with the rear wall also including a corresponding first edge;

the first edges meeting at a perpendicular plane so as to form a gap;

said corner rail extrusion comprising:

a pair of outwardly and generally perpendicular extending legs comprising a first leg and a second leg;

the first leg and second leg being integrally connected at one end of each of the legs;

the corner rail extrusion further including a central bulbous interior;

the central bulbous interior position so as to expand the corner formed by the side wall and rear wall, and with the bulbous interior fitting into the gap.

* * * * *